(12) United States Patent
Tristan

(10) Patent No.: US 7,390,681 B1
(45) Date of Patent: Jun. 24, 2008

(54) DERIVED METRIC FOR MONITORING DIE PLACEMENT

(75) Inventor: John E. Tristan, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 0 days.

(21) Appl. No.: 11/622,635

(22) Filed: Jan. 12, 2007

(51) Int. Cl.
*H01L 21/66* (2006.01)

(52) U.S. Cl. .............................. 438/15; 438/106; 716/9; 700/114

(58) Field of Classification Search ................. 700/108, 700/111, 114, 121, 80, 109; 716/1, 2, 8, 716/9; 382/145, 147, 151; 257/777; 29/740; 345/145, 147, 151; 438/14, 15, 26, 106; 702/81, 82, 158
See application file for complete search history.

(56) References Cited

U.S. PATENT DOCUMENTS

| | | | | |
|---|---|---|---|---|
| 4,342,090 A * | 7/1982 | Caccoma et al. ............... 716/8 |
| 4,980,971 A * | 1/1991 | Bartschat et al. .............. 29/740 |
| 5,189,707 A * | 2/1993 | Suzuki et al. ................ 382/151 |
| 5,792,580 A * | 8/1998 | Tomimatu ................... 438/975 |
| 6,118,670 A * | 9/2000 | Radford et al. .............. 257/786 |
| 6,198,976 B1 * | 3/2001 | Sundar et al. ................ 700/121 |
| 6,205,636 B1 * | 3/2001 | Abe et al. .................... 700/194 |
| 6,461,938 B2 * | 10/2002 | Nakabayashi .............. 438/458 |
| 6,537,835 B2 * | 3/2003 | Adachi et al. ................. 438/15 |
| 6,617,678 B2 * | 9/2003 | Yamazaki et al. ........... 257/777 |
| 6,718,626 B2 * | 4/2004 | Kawada ....................... 29/740 |
| 7,052,968 B1 * | 5/2006 | Lee et al. .................... 438/401 |
| 7,132,359 B2 * | 11/2006 | Howard et al. .............. 438/617 |
| 7,341,887 B2 * | 3/2008 | Wong et al. ................. 438/106 |
| 2004/0128630 A1 * | 7/2004 | Ward et al. ..................... 716/2 |
| 2006/0094222 A1 * | 5/2006 | Wong et al. ................. 438/601 |

* cited by examiner

*Primary Examiner*—Charles R Kasenge
(74) *Attorney, Agent, or Firm*—Williams, Morgan & Amerson, P.C.

(57) ABSTRACT

A method for monitoring die placement includes receiving measurements of an alignment of a semiconductor die mounted in a package by a die packaging tool. The measurements include center offset metrics associated with displacement of a center of the die. A plurality of corner offset metrics is determined based on the center offset metrics and dimensions of the die. A maximum one of the corner offset metrics is selected as a die placement metric. An out of tolerance condition with the die packaging tool is identified based on the die placement metric.

21 Claims, 4 Drawing Sheets

DERIVED METRIC FOR MONITORING DIE PLACEMENT

CROSS-REFERENCE TO RELATED APPLICATIONS

Not applicable.

BACKGROUND OF THE INVENTION

The present invention relates generally to manufacturing and, more particularly, to the use of a derived metric for monitoring die placement.

Semiconductor die are normally formed in large quantities on wafers of semiconductor material, for example, silicon. After die are singulated from the wafers, they may be individually packaged in plastic or ceramic packages, for example. A lead frame may support the die for wire bonding and packaging and provide the lead system for the completed package. In general, electrical circuitry formed on the die is coupled to bond pads on the die to facilitate interconnection of the electrical circuitry with the outside world. During the wire bonding and packaging process, each bond pad is electrically connected by way of wire leads to the lead frame. The electrical connection includes a wire bond formed on the bond pad, a wire lead and a wire bond formed on the lead frame. An encapsulating material protects and insulates the die, and the die is mounted in a package having external pins for interconnecting the electrical circuitry on the die, via the wire bonds, to the outside world.

A packaging tool places the die on the package for attachment thereto. The package typically includes reference marks, commonly referred to as fiducial marks, for use by the packaging tool. Following the placement of the die, a placement measurement tool determines, on a sampling basis, the accuracy of the placement by measuring the rectangular offsets between the actual center of the mounted die and expected center point (i.e., with perfect alignment) and an angular offset resulting from rotation of the die with respect to the package. The placement measurement tool thus outputs an x-offset, h, a y-offset, k, and an angular offset, θ, as illustrated in FIG. 1, where the actual die 100 is illustrated using solid lines, and the ideal die placement 110 is illustrated using phantom lines. The degree of misalignment is exaggerated for illustrative purposes.

The results reported by the placement measurement tool are typically trended using statistical process control (SPC) techniques, such as control charts. Each type of device manufactured in a facility may have a different size. Hence, the actual displacement of the corners of the device, where misalignment between the bond pads and the lead frame is most likely to cause packaging faults, is not readily apparent given the center and rotation measurements. A typical fabrication facility processes devices of differing types on multiple fabrication lines. Due to the large number of product sizes, different packaging tools, and different placement measurement tools, the amount of die placement data generated is extremely large. Given the volume of the data and the differing size characteristics of the packaged die, it is sometimes difficult for facility operators or automatic management systems to identify performance problems with a particular placement tool by trending the offset data.

This section of this document is intended to introduce various aspects of art that may be related to various aspects of the present invention described and/or claimed below. This section provides background information to facilitate a better understanding of the various aspects of the present invention. It should be understood that the statements in this section of this document are to be read in this light, and not as admissions of prior art. The present invention is directed to overcoming, or at least reducing the effects of, one or more of the problems set forth above.

BRIEF SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

One aspect of the present invention is seen in a method for monitoring die placement. The method includes receiving measurements of an alignment of a semiconductor die at least partially mounted in a package by a die packaging tool. The measurements include center offset metrics associated with displacement of a center of the die. A plurality of corner offset metrics is determined based on the center offset metrics and dimensions of the die. A maximum one of the corner offset metrics is selected as a die placement metric. An out of tolerance condition with the die packaging tool is identified based on the die placement metric.

Another aspect of the present invention is seen in a system including a die placement metrology tool and a placement monitor. The die placement metrology tool is operable to measure an alignment of a semiconductor die at least partially mounted in a package by a die packaging tool to generate center offset metrics associated with displacement of a center of the die. The placement monitor is operable to determine a plurality of corner offset metrics based on the center offset metrics and dimensions of the die, select a maximum one of the corner offset metrics as a die placement metric, and identify an out of tolerance condition with the die packaging tool based on the die placement metric.

BRIEF DESCRIPTION OF THE SEVERAL VIEWS OF THE DRAWINGS

The invention will hereafter be described with reference to the accompanying drawings, wherein like reference numerals denote like elements, and.

Figure 1:
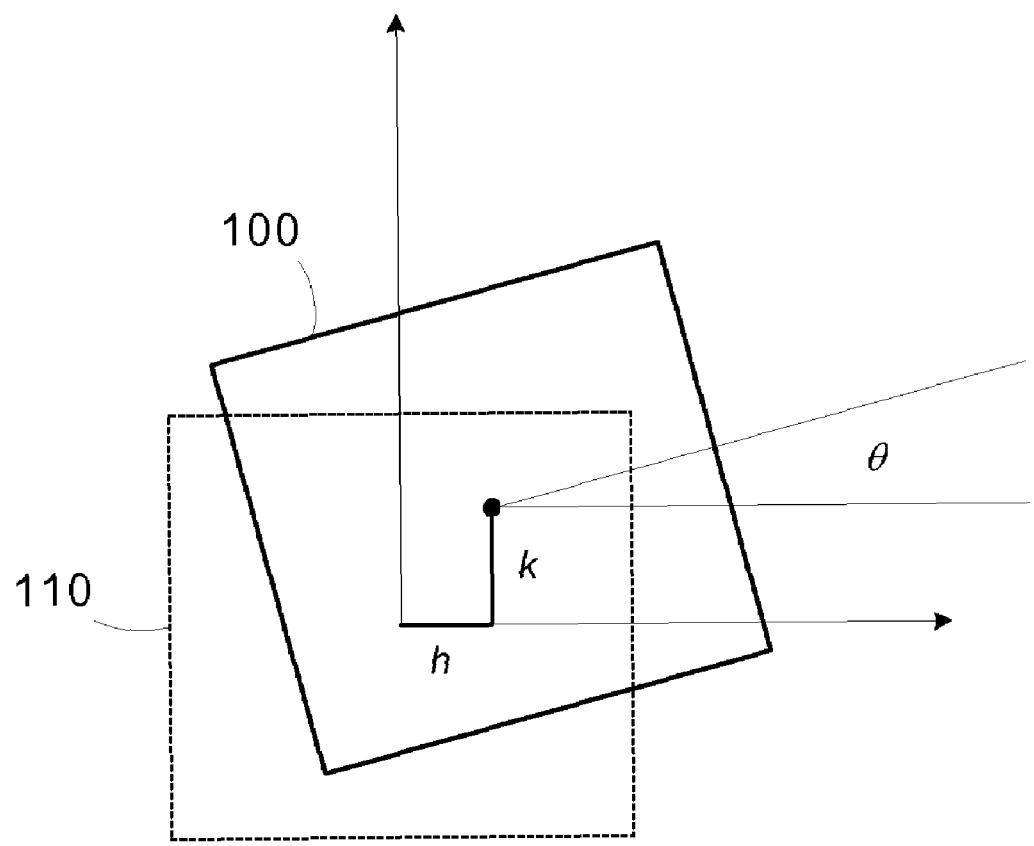
FIG. 1 is a diagram illustrating die misalignment occurring in the packaging process.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 2:
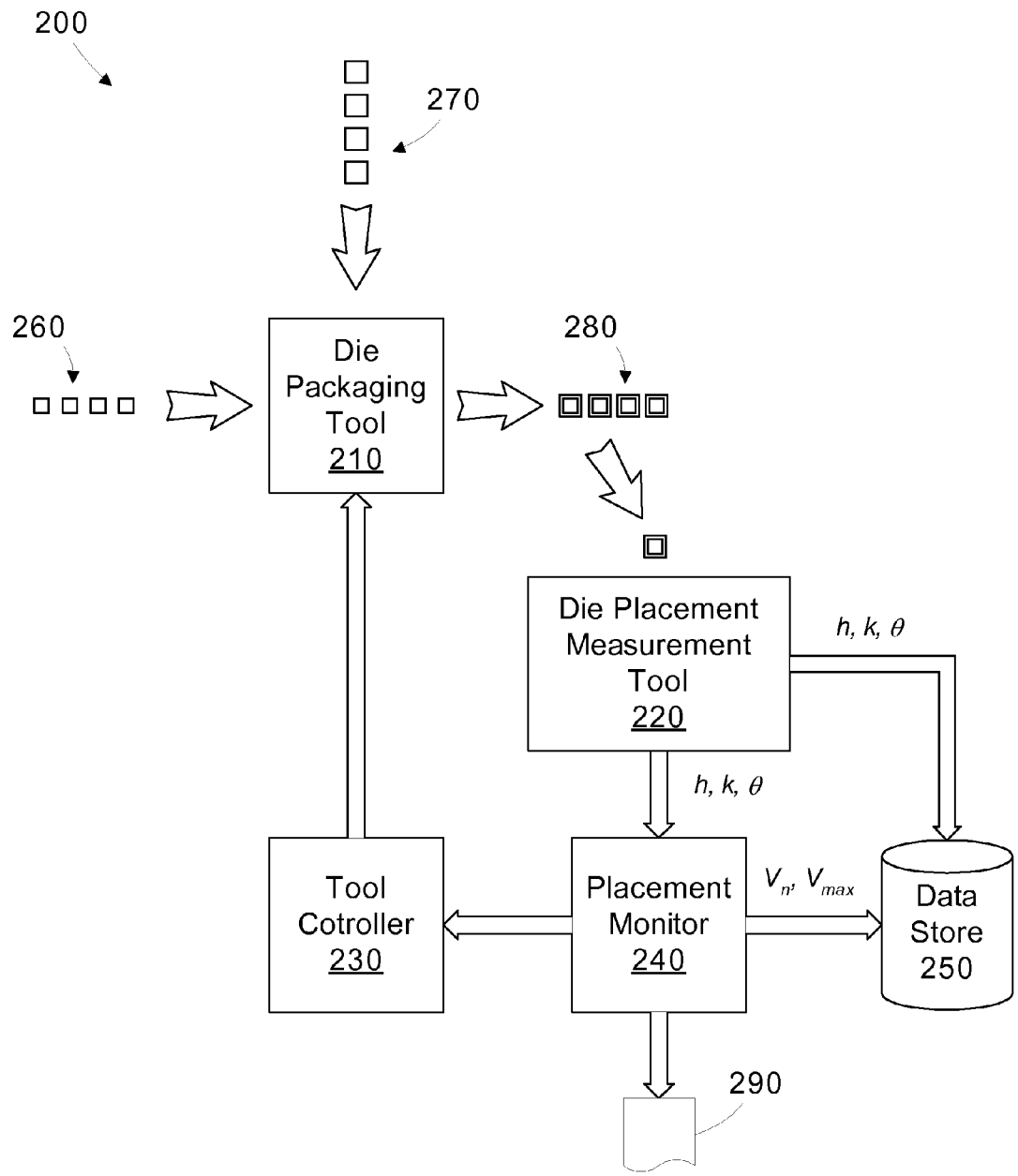
FIG. 2 is a simplified block diagram of a die packaging system in accordance with one illustrative embodiment of the present invention.

Referring now to the drawings wherein like reference numbers correspond to similar components throughout the several views and, specifically, referring to FIG. 2, the present invention shall be described in the context of a die packaging system 200. The die packaging system 200 includes a die packaging tool 210, a die placement measurement tool 220, a tool controller 230, a placement monitor 240, and a data store 250. The die packaging tool 210 receives individual semiconductor die 260 and mounts them to packages 270 to fabricate packaged devices 280. At least a portion of the packaged devices 280 are provided to the die placement measurement tool 220 on a sampling basis to determine that accuracy at which the die packaging tool 210 mounted the die 260. The diagram of FIG. 2 illustrates a single packaging line. In an actual fabrication facility, multiple packaging lines processing a plurality of different types of devices may be present.

The die placement measurement tool 220 outputs measurements of the position offsets, h and k, and the angular offset, θ, collectively referred to as die center displacement metrics. As will be described in greater detail below, the placement monitor 240 transforms the center displacement metrics to corner offset metrics, $V_N$, and derives a die placement metric, $V_{MAX}$ representative of the maximum corner displacement.

Subsequently, the performance of the die packaging tool 210 may be monitored on the basis of a single metric that gives an actual amount of displacement of the corner. The degree to which the misalignment affects the integrity of the connection between the semiconductor die 260 and the packages 270 may be more readily discerned due to the representation of corner displacement. Moreover, the amount data that must be tracked and organized is significantly reduced.

In one embodiment, the die placement measurement tool 220 may pass the center displacement metrics to the placement monitor 240 and store them in the data store 250. Alternatively, the placement monitor 240 may receive the center displacement metrics, derive the corner displacement metrics and overall die placement metric, and store them all in the data store 250. In yet another embodiment, the placement monitor 240 may retrieve the center displacement metrics from the data store 250 instead of receiving them directly from the die placement measurement tool 220.

Figure 3:
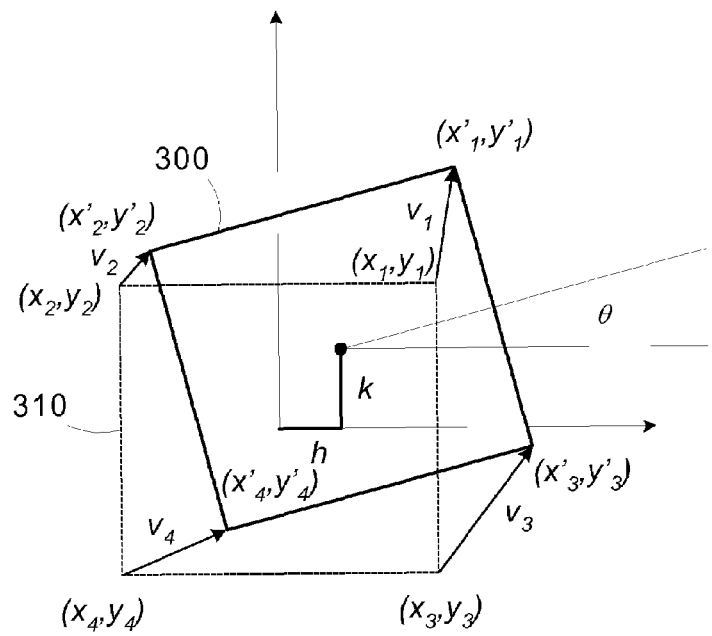
FIG. 3 is a diagram illustrating the use of a derived metric for monitoring die placement.

Turning now to FIG. 3, a diagram illustrating the operation of the placement monitor 240 in generating the die placement metric is described. The die 300 is offset from the ideal die placement 310, as shown in an exaggerated fashion for purposes of illustration.

Based on the known product type of the die 300, the placement monitor 240 defines ordered pairs, $(x_n, y_n)$, representing baseline coordinates for each of the corners given the ideal die placement 310.

Using the following transformation, the placement monitor 240 determines the actual coordinates, $(x'_n, y'_n)$, of the corners of the die 300 based on the center displacement metrics and the ideal corner coordinates.

$$\begin{bmatrix} x'_n \\ y'_n \\ 1 \end{bmatrix} = \begin{bmatrix} \cos\theta & -\sin\theta & h \\ \sin\theta & \cos\theta & k \\ 0 & 0 & 1 \end{bmatrix} \cdot \begin{bmatrix} x_n \\ y_n \\ 1 \end{bmatrix} \quad (1)$$

Corner displacement vectors, $v_n$, are then calculated for each of the corners of the die 300.

$$|v_n| = \sqrt{(x_n - x_n')^2 + (y_n - y_n')^2} \quad (2)$$

The overall die placement metric is then generated by selecting the maximum corner displacement.

$$v_{max} = \max(|v_1|, |v_2|, |v_3|, |v_4|) \quad (3)$$

In the illustrated example of FIG. 3, the corner displacement metric, $v_3$, represents the maximum corner displacement and is selected as the die placement metric.

Returning now to FIG. 2, there are various uses for the die placement metric. In some embodiments, the placement monitor 240 may automatically monitor the die placement metric and take action if the value exceeds a predetermined threshold. In one embodiment, the placement monitor 240 may alert the tool controller 230 that a tool adjustment may be necessary. In turn, the tool controller 230 may retrieve the center and/or corner offset metrics associated with the die placement metric that exceeded the threshold from the data store 250 to automatically adjust the die packaging tool 210 to improve performance. For example, the placement recipe offsets of the die packaging tool can be calculated or re-calculated, and one or more of the alignment offsets (h, k, θ) may be adjusted by the tool controller 230 to adjust the alignment performance. In another embodiment, the placement monitor 240 may send an alert message 290 to an engineer or an operator, or send the message 290 directly to a maintenance scheduling server to schedule a preventative maintenance activity.

Figure 4:
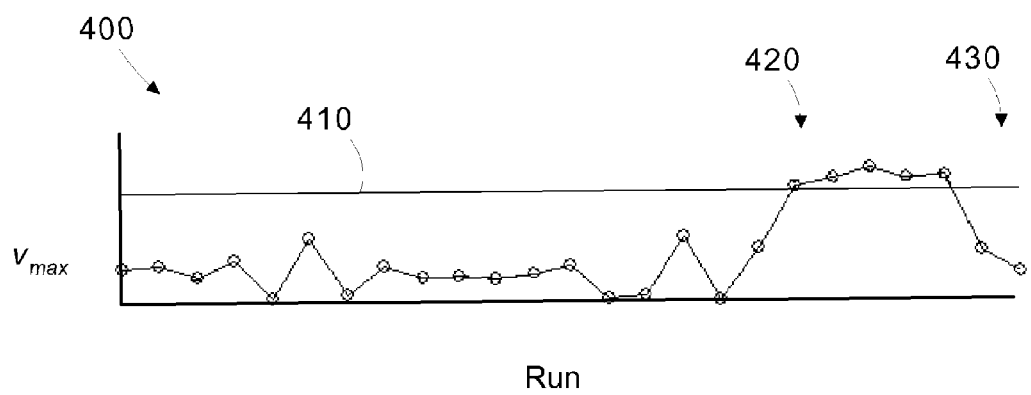
FIG. 4 is a control chart illustrating the monitoring of a die packaging tool using the derived metric illustrated in FIG. 3.

Referring briefly to FIG. 4, an exemplary control chart 400 illustrating the derived die placement metrics over a plurality of runs of the die packaging tool 210. The predetermined threshold for identifying an out of tolerance condition with the die packaging tool 210 is illustrated by line 410. In region 420, the die placement metrics exceed the threshold 410. The placement monitor 240 addresses the potential out of tolerance condition by interfacing with the tool controller 230 or sending the alert message 290. Following some corrective action, such as an automatic adjustment of the die packaging tool 210 by the tool controller 230 or the performance of a maintenance procedure, the die placement metrics are less than the threshold 410 in region 430.

Figure 5:
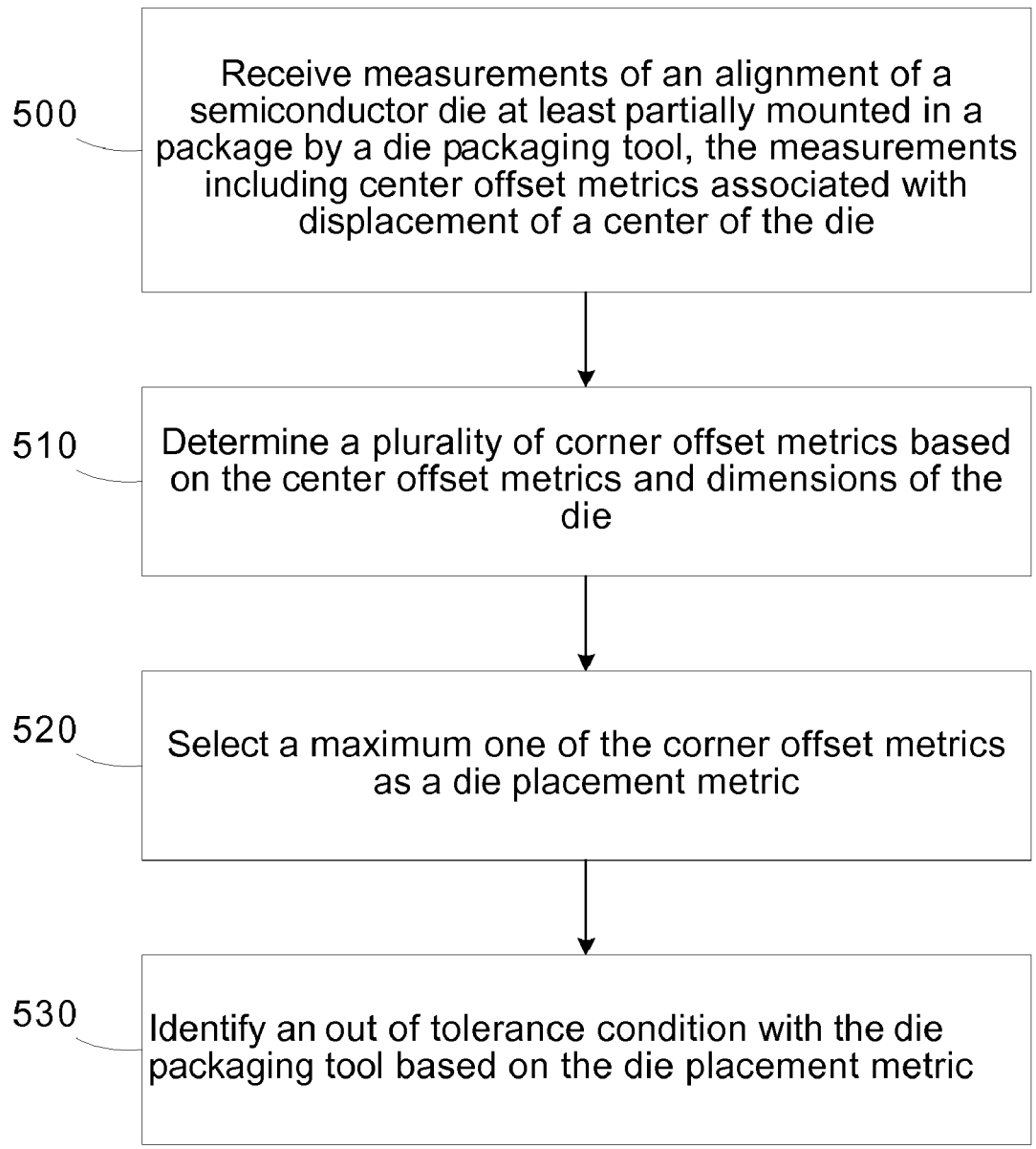
FIG. 5 is a simplified flow diagram of a method for monitoring die placement in accordance with another illustrative embodiment of the present invention.

Turning now to FIG. 5, a simplified flow diagram of a method for monitoring die placement in accordance with another illustrative embodiment of the present invention is shown. In method block 500, measurements of an alignment of a semiconductor die at least partially mounted in a package by a die packaging tool are received. The measurements include center offset metrics associated with displacement of a center of the die. A plurality of corner offset metrics is determined based on the center offset metrics and dimensions of the die in method block 510. In method block 520, a maximum one of the corner offset metrics is selected as a die placement metric. In method block 530, an out of tolerance condition with the die packaging tool is identified based on the die placement metric.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

I claim:

1. A method for monitoring die placement, comprising:
   receiving measurements of an alignment of a semiconductor die mounted in a package by a die packaging tool, the measurements including center offset metrics associated with displacement of a center of the die with respect to an ideal placement of the die;
   determining a plurality of corner offset metrics based on the center offset metrics and dimensions of the die;
   selecting a maximum one of the corner offset metrics as a die placement metric; and
   identifying an out of tolerance condition with the die packaging tool based on the die placement metric.

2. The method of claim 1, wherein the center offset metrics comprise rectangular offsets and an angular offset.

3. The method of claim 1, wherein determining each of the corner offset metrics comprises:
   determining baseline coordinates of each corner for the ideal placement of the die;
   determining a plurality of corner vectors defining the position of actual corners of the die with respect to the baseline coordinates for the associated corner; and
   determining a magnitude of each corner vector.

4. The method of claim 3, wherein determining the plurality of corner vectors comprises employing the equation $$\begin{bmatrix} x'_n \\ y'_n \\ 1 \end{bmatrix} = \begin{bmatrix} \cos\theta & -\sin\theta & h \\ \sin\theta & \cos\theta & k \\ 0 & 0 & 1 \end{bmatrix} \cdot \begin{bmatrix} x_n \\ y_n \\ 1 \end{bmatrix},$$

where $(x_n, y_n)$ represents the baseline coordinates for an n-th corner, $(x'_n, y'_n)$ represents coordinates of the associated actual corner, h represents a horizontal center offset, k represents a vertical center offset, and $\theta$ represents an angular center offset.

5. The method of claim 1, further comprising automatically adjusting at least one parameter of the die packaging tool responsive to identifying the out of tolerance condition.

6. The method of claim 5, further comprising adjusting the at least one parameter of the die packaging tool based on the center offset metrics associated with the die placement metric.

7. The method of claim 1, further comprising sending an alert message to an operator of the die packaging tool responsive to identifying the out of tolerance condition.

8. The method of claim 1, further comprising sending an alert message to a maintenance scheduling server responsive to identifying the out of tolerance condition.

9. The method of claim 1, further comprising:
   determining die placement metrics for a plurality of semiconductor die;
   generating a control chart including the die placement metrics; and
   identifying the out of tolerance condition based on the control chart.

10. A system, comprising:
    a die placement metrology tool operable to measure an alignment of a semiconductor die at least partially mounted in a package by a die packaging tool to generate center offset metrics associated with displacement of a center of the die with respect to an ideal placement of the die; and
    a placement monitor operable to determine a plurality of corner offset metrics based on the center offset metrics and dimensions of the die, select a maximum one of the corner offset metrics as a die placement metric, and identify an out of tolerance condition with the die packaging tool based on the die placement metric.

11. The system of claim 10, wherein the center offset metrics comprise rectangular offsets and an angular offset.

12. The system of claim 10, wherein the placement monitor is further operable to determine baseline coordinates of each corner for the ideal placement of the die, determine a plurality of corner vectors defining the position of actual corners of the die with respect to the baseline coordinates for the associated corner, and determine a magnitude of each corner vector.

13. The system of claim 12, wherein the placement monitor is operable to generate the corner vectors comprises by employing the equation $$\begin{bmatrix} x'_n \\ y'_n \\ 1 \end{bmatrix} = \begin{bmatrix} \cos\theta & -\sin\theta & h \\ \sin\theta & \cos\theta & k \\ 0 & 0 & 1 \end{bmatrix} \cdot \begin{bmatrix} x_n \\ y_n \\ 1 \end{bmatrix},$$

where $(x_n, y_n)$ represents the baseline coordinates for an n-th corner, $(x'_n, y'_n)$ represents coordinates of the associated actual corner, h represents a horizontal center offset, k represents a vertical center offset, and θ represents an angular center offset.

14. The system of claim 10, further comprising a tool controller operable to receive notification of the out of tolerance condition from the placement monitor and adjust at least one parameter of the die packaging tool.

15. The system of claim 14, wherein the tool controller is operable to adjust the at least one parameter of the die packaging tool based on the center offset metrics associated with the die placement metric.

16. The system of claim 10, wherein the placement monitor is further operable to send an alert message to an operator of the die packaging tool responsive to identifying the out of tolerance condition.

17. The system of claim 10, wherein the placement monitor is further operable to send an alert message to a maintenance scheduling server responsive to identifying the out of tolerance condition.

18. The system of claim 10, wherein the placement monitor is further operable to determine die placement metrics for a plurality of semiconductor die, generate a control chart including the die placement metrics, and identify the out of tolerance condition based on the control chart.

19. A system, comprising:
means for receiving measurements of an alignment of a semiconductor die at least partially mounted in a package by a die packaging tool, the measurements including center offset metrics associated with displacement of a center of the die with respect to an ideal placement of the die;
means for determining a plurality of corner offset metrics based on the center offset metrics and dimensions of the die;
means for selecting a maximum one of the corner offset metrics as a die placement metric; and
means for identifying an out of tolerance condition with the die packaging tool based on the die placement metric.

20. The system of claim 19, further comprising:
means for determining baseline coordinates of each corner for the ideal placement of the die;
means for determining a plurality of corner vectors defining the position of actual corners of the die with respect to the baseline coordinates for the associated corner; and
means for determining a magnitude of each corner vector.

21. The system of claim 20, wherein the means for determining the plurality of corner vectors comprises means for employing the equation $$\begin{bmatrix} x'_n \\ y'_n \\ 1 \end{bmatrix} = \begin{bmatrix} \cos\theta & -\sin\theta & h \\ \sin\theta & \cos\theta & k \\ 0 & 0 & 1 \end{bmatrix} \cdot \begin{bmatrix} x_n \\ y_n \\ 1 \end{bmatrix},$$

where $(x_n, y_n)$ represents the baseline coordinates for an n-th corner, $(x'_n, y'_n)$ represents coordinates of the associated actual corner, h represents a horizontal center offset, k represents a vertical center offset, and θ represents an angular center offset.

* * * * *